United States Patent
Kouno et al.

(10) Patent No.: US 10,493,807 B2
(45) Date of Patent: Dec. 3, 2019

(54) PNEUMATIC TIRE

(71) Applicant: BRIDGESTONE CORPORATION, Chuo-ku, Tokyo (JP)

(72) Inventors: Yoshihide Kouno, Tokyo (JP); Seiji Kon, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 275 days.

(21) Appl. No.: 14/900,616

(22) PCT Filed: Jun. 27, 2014

(86) PCT No.: PCT/JP2014/067272
§ 371 (c)(1),
(2) Date: Dec. 22, 2015

(87) PCT Pub. No.: WO2015/005150
PCT Pub. Date: Jan. 15, 2015

(65) Prior Publication Data
US 2016/0144671 A1    May 26, 2016

(30) Foreign Application Priority Data

Jul. 11, 2013 (JP) .................................. 2013-145808

(51) Int. Cl.
*B60C 13/02* (2006.01)
*B60C 19/00* (2006.01)
(Continued)

(52) U.S. Cl.
CPC ............... *B60C 19/00* (2013.01); *B60C 5/01* (2013.01); *B60C 11/00* (2013.01); *B60C 13/02* (2013.01);
(Continued)

(58) Field of Classification Search
CPC .................... B60C 13/02; B60C 2013/026
See application file for complete search history.

(56) References Cited

U.S. PATENT DOCUMENTS 3,482,616 A * 12/1969 French .................... B60C 11/01
152/209.16
3,913,654 A * 10/1975 French .................... B60C 13/00
152/521
(Continued)

FOREIGN PATENT DOCUMENTS

| CN | 101195328 A | 6/2008 |
| EP | 0425299 A2 | 5/1991 |

(Continued)

OTHER PUBLICATIONS

English machine translation of JP2012-140070. (Year: 2012).*
English machine translation of JP2006-151234. (Year: 2006).*
English machine translation of JP2007-302072. (Year: 2007).*

*Primary Examiner* — Robert C Dye
(74) *Attorney, Agent, or Firm* — Solaris Intellectual Property Group, PLLC (57) ABSTRACT

Plural inner face grooves 40 are formed to tire inner faces of a tire frame member 17 formed from a resin material. The inner face grooves 40 are formed to a region from an inner separation point corresponding to a separation point of a bead portion 12 from a rim 20 as far as an inner end portion 30 IN corresponding to a tread end 30A of a tread member 30.

4 Claims, 5 Drawing Sheets (51) Int. Cl.
  *B60C 5/01* (2006.01)
  *B60C 11/00* (2006.01)
  *B60C 15/00* (2006.01)
  *B60C 13/00* (2006.01)

(52) U.S. Cl.
  CPC ........ *B60C 15/00* (2013.01); *B60C 2013/026* (2013.01)

(56) References Cited

U.S. PATENT DOCUMENTS

| | | | | |
|---|---|---|---|---|
| 4,936,365 | A * | 6/1990 | Chrobak | B60C 3/04 |
| | | | | 152/452 |
| 7,086,438 | B1 * | 8/2006 | Vossberg | B60C 13/02 |
| | | | | 152/165 |
| 2007/0169869 | A1 * | 7/2007 | Ishida | B60C 11/0083 |
| | | | | 152/522 |
| 2008/0128066 | A1 | 6/2008 | Mitarai et al. | |
| 2011/0297283 | A1 * | 12/2011 | Kouno | B60C 1/0025 |
| | | | | 152/209.1 |
| 2011/0297289 | A1 * | 12/2011 | Kouno | B29D 30/1628 |
| | | | | 152/539 |
| 2013/0206301 | A1 * | 8/2013 | Fudemoto | B60C 9/22 |
| | | | | 152/450 |

FOREIGN PATENT DOCUMENTS

| | | | |
|---|---|---|---|
| JP | H03-143701 A | | 6/1991 |
| JP | 2006-151234 | * | 6/2006 |
| JP | 2007-302072 | * | 11/2007 |
| JP | 2012-106444 A | | 6/2012 |
| JP | 2012-140070 A | | 7/2012 |
| WO | WO2012/026547 | * | 3/2012 |

* cited by examiner

PNEUMATIC TIRE

TECHNICAL FIELD

The present invention relates to a pneumatic tire, and in particular, to a pneumatic tire in which a tire frame member is formed using a resin material.

BACKGROUND ART

Pneumatic tires formed from rubber, organic fiber materials, and steel members are already known. There is recently demand, from the viewpoints of weight reduction and ease of recycling, to make tire frame members from thermoplastic polymers such as thermoplastic elastomers (TPE) and thermoplastic resins. A pneumatic tire formed employing a tire frame member formed by covering a bead core with a thermoplastic elastomer is described, for example, in Patent Document 1.

RELATED DOCUMENTS

Patent Documents

Patent Document 1: Japanese Patent Application Laid-Open (JP-A) No. H03-143701

SUMMARY OF INVENTION

Technical Problem

For a tire frame member formed with a resin material in this manner, compression force acts on a tire inner face during vehicle travel. Alleviating the compression force is linked to improving the durability of the tire.

In consideration of the above circumstances, the present invention addresses reducing the load on a tire due to compression force acting on the tire inner face.

Solution to Problem

A pneumatic tire according to the first aspect of the present invention includes: a tire frame member that is made of resin and that includes: a bead portion; a side portion connected to an outer side of the bead portion in a tire radial direction; and a crown portion that is connected to an inner side of the side portion in a tire width direction and on which a tread is disposed; a tread member that is disposed at an outer side of the tire frame member in the tire radial direction and that configures a tire tread; and an inner face groove that is formed at an inner face of the tire frame member on at least a portion of a region from an inner separation point corresponding to a separation point from a flange of a rim in an attached state to the rim, to an inner end portion corresponding to an end portion of the tread member.

In the above configuration, due to the inner face groove formed to the tire inner face, the resin deforms more easily at the tire inner face, thereby enabling stress and strain due to compression force acting on the tire inner face to be alleviated, and enabling load to the tire frame member formed from a resin material to be reduced.

Note that the inner face groove of the present invention is distinct from a simple curving shape formed to the tire inner face, and refers to a groove extending in a straight line or bent in a specific direction, or a groove extending so as to configure an outer peripheral border in a rectangular shape, polygonal shape, circular shape, or the like. In the present invention, the inner face groove encompasses a notch that effectively does not have a groove width.

In a pneumatic tire according to a second aspect of the present invention, an inter-groove pitch of plural of the inner face grooves is larger than a groove width of the inner face grooves.

In the above configuration, the inner face grooves are separated from each other, such that the resin material deforms more easily than in cases in which the grooves are not separated and are formed contiguously. This thereby enables stress and strain due to compression force acting on the tire inner face to be alleviated, and enables load to the tire frame member formed from a resin material to be reduced.

In a pneumatic tire according to a third aspect of the present invention, a groove spacing between adjacent grooves of plural of the inner face grooves is from 1 mm to 10 mm.

When the groove spacing is less than 1 mm, processing is difficult when the precision of the spacing of the inner face grooves is considered, and when the groove spacing is over 10 mm, an advantageous effect of alleviating concentration of stress is small, and so the groove spacing is preferably from 1 mm to 10 mm.

In a pneumatic tire according to a fourth aspect of the present invention, a groove depth of the inner face groove is from 0.2 mm to 1.5 mm.

When the groove depth of the inner face groove is less than 0.2 mm, the advantageous effect of alleviating stress is small, and when the groove depth is over 1.5 mm, the strength of the tire frame member is reduced, and so the groove depth of the inner face groove is preferably from 0.2 mm to 1.5 mm.

Advantageous Effects of Invention

As explained above, in the pneumatic tire according to the present invention, load due to compression force acting on the tire inner face can be reduced.

DESCRIPTION OF EMBODIMENTS

Explanation follows regarding exemplary embodiments of the present invention, while giving examples of exemplary embodiments. In the drawings, the arrow W indicates the tire axial direction, the arrow R indicates the tire radial direction extending from a tire axis (not illustrated in the drawings) in a radial direction of the tire, and the arrow C indicates the tire circumferential direction.

Figure 1:
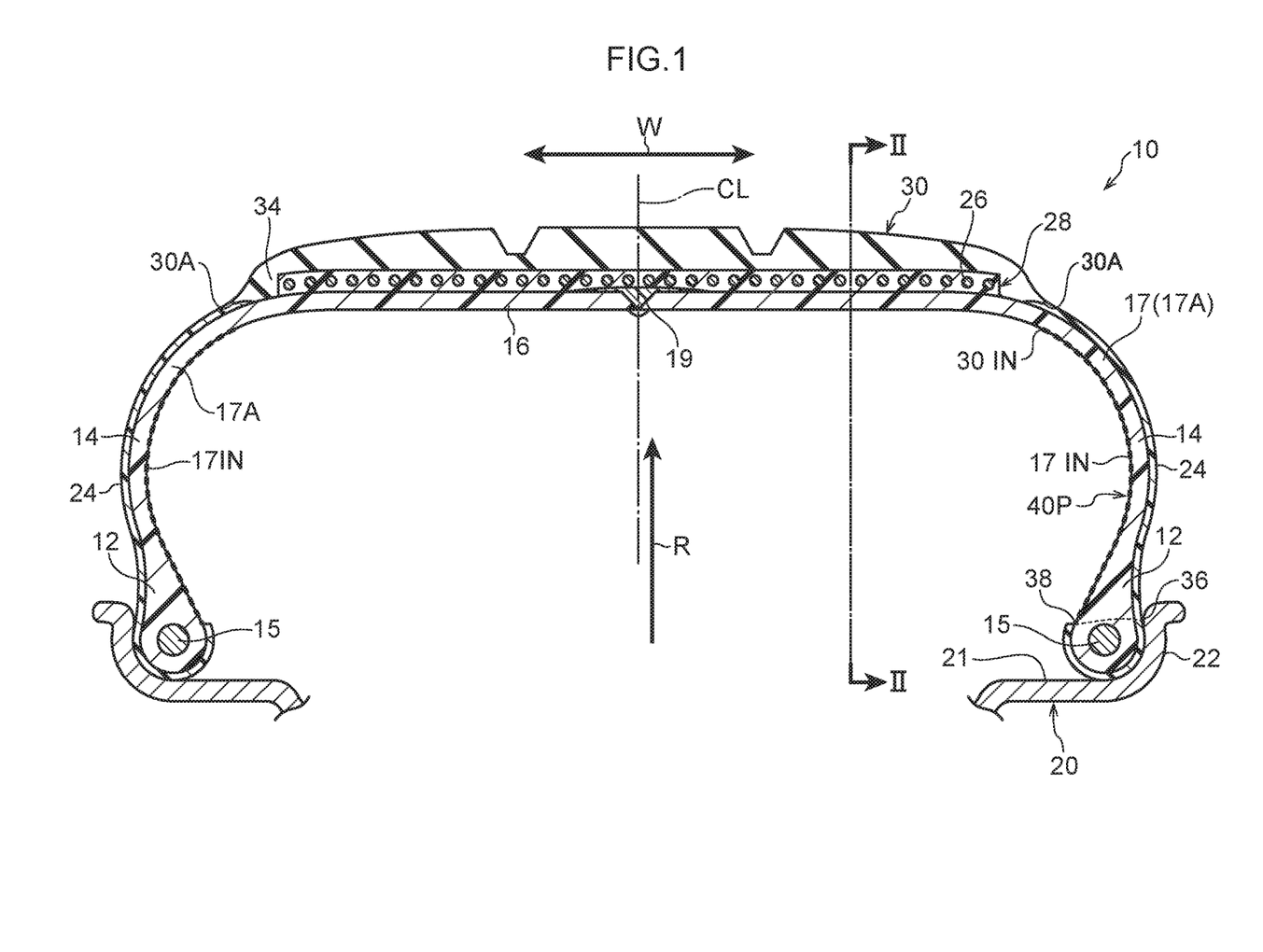
FIG. 1 is a cross section of a pneumatic tire according to an exemplary embodiment of the present invention.

As illustrated in FIG. 1, a pneumatic tire of the present exemplary embodiment is a tire employed filled with air inside. A pneumatic tire 10 includes a circular tire frame member 17. The tire frame member 17 includes a pair of bead portions 12, side portions 14 extending from each bead portion 12 toward the tire radial direction outside, and a crown portion 16 that couples together tire radial direction outside ends of the respective side portions 14. Note that herein, the bead portion refers to a range from a tire radial direction inside end as far as 30% of the tire cross section height. Each of the pair of bead portions 12 closely contacts a bead seat 21 and a rim flange 22 of a rim 20, so as to maintain the internal pressure of the air filled inside the tire. Note that a boundary portion where the bead portion 12 separates from the rim 20 is referred to as a separation point 36, this being a point where the tire separates from the rim flange when the tire is mounted to the appropriate rim according to the dimensions of the tire as listed in the Japan Automobile Tire Manufacturer's Association (JATMA) YEAR BOOK 2013, and in an un-loaded state at the internal pressure specified therein. A position on the tire inner face side corresponding to a tire axial W direction extension line of the separation point 36 configures an inner separation point 38. A tread member 30 configuring a tire tread, this being a tire ground contact portion, is disposed on the tire radial direction outside of the crown portion 16.

The tire frame member 17 is made of resin, and is formed with a resin material as the main raw material. Here, the term resin material does not include vulcanized rubber. Examples of the resin material include thermoplastic resins (including thermoplastic elastomers), thermosetting resins, and other general use resins, as well as engineering plastics (including super engineering plastics).

Thermoplastic resins (including thermoplastic elastomers) are polymer compounds of materials that soften and flow with increasing temperature, and that adopt a relatively hard and strong state when cooled. In the present specification, out of these, distinction is made between polymer compounds of materials that soften and flow with increasing temperature, that adopt a relatively hard and strong state on cooling, and that have a rubber-like elasticity, considered to be thermoplastic elastomers, and polymer compounds of materials that soften and flow with increasing temperature, that adopt a relatively hard and strong state on cooling, and do not have a rubber-like elasticity, considered to be non-elastomer thermoplastic resins.

Examples of thermoplastic resins (including thermoplastic elastomers) include thermoplastic polyolefin-based elastomers (TPO), thermoplastic polystyrene-based elastomers (TPS), thermoplastic polyamide-based elastomers (TPA), thermoplastic polyurethane-based elastomers (TPU), thermoplastic polyester-based elastomers (TPC), and thermoplastic dynamically crosslinking-type elastomers (TPV), as well as thermoplastic polyolefin-based resins, thermoplastic polystyrene-based resins, thermoplastic polyamide-based resins, and thermoplastic polyester-based resins.

Such thermoplastic materials have, for example, a deflection temperature under load (at loading of 0.45 MPa), as defined by ISO 75-2 or ASTM D648, of 78° C. or greater, a tensile yield strength, as defined by JIS K7113, of 10 MPa or greater, and a tensile elongation at break (JIS K7113), also as defined by JIS K7113, of 50% or greater. Materials with a Vicat softening temperature, as defined in JIS K7206 (method A), of 130° C. may be employed.

Thermosetting resins refers to polymer compounds that form a three-dimensional mesh structure and harden with increasing temperature. Examples of thermosetting resins include phenolic resins, epoxy resins, melamine resins, and urea resins.

In addition to the thermoplastic resins (including thermoplastic elastomers) and thermosetting resins already listed above, general purpose resins may also be employed as the resin material, such as (meth)acrylic-based resins, EVA resins, vinyl chloride resins, fluororesins, and silicone-based resins.

In the present exemplary embodiment, explanation is given regarding a case in which the tire frame member 17 is formed from a thermoplastic resin.

The tire frame member 17 is formed from circular tire frame half parts 17A that are formed in the same shape as each other by integrating together one of the bead portions 12, one of the side sections 14, and half the width of the crown portion 16. The tire frame half parts 17A are aligned with each other and joined together at tire equatorial plane CL portions thereof. A thermoplastic welding material 19 is employed at the join between the tire equatorial plane CL portions. Note that the tire frame member 17 is not limited to being formed by joining of two members, and may be formed by joining three or more members, or may be integrally formed from a pair of bead portions 12, a pair of side portions 14, and a crown portion 16.

The tire frame half part 17A formed using a thermoplastic resin may, for example, be formed by vacuum molding, pressure molding, injection molding, melt casting, or the like, enabling the manufacturing process to be greatly simplified, and enabling molding time to be reduced compared to cases in which the tire frame half part 17A is molded (vulcanized) using rubber. Note that the tire frame member 17 may be configured by a single thermoplastic material, or may employ thermoplastic resin materials having different characteristics in each section of the tire frame member 17 (such as the side portions 14, crown portion 16, bead portions 12), similarly to ordinary conventional pneumatic tires made of rubber.

An annular bead core 15 is embedded in each of the bead portions 12 of the tire frame member 17. The bead core 15 is formed from a steel cord, similarly to in ordinary conventional pneumatic tires. Note that the bead core 15 may be omitted as long as the rigidity of the bead portion 12 is secured, and there are no issues with fitting onto the rim 20. The bead core 15 may also be formed with a cord other than a steel cord, such as an organic fiber cord, a resin-covered organic fiber cord, or the like. Moreover, the bead core 15 may be configured from a hard resin formed by injection molding instead of a cord.

A reinforcement layer 28 provided with spirally wound steel cords 26 is embedded in the crown portion 16 of the tire frame member 17. The reinforcement layer 28 is equivalent to a belt that is disposed at an outer peripheral face of the carcass in a conventional pneumatic tire made of rubber.

Covering layers 24 are formed on an outer face of the tire frame member 17, spanning from each bead portion 12 to the tread member 30. An end portion of each covering layer 24 on the bead portion 12 side is disposed so as to reach further toward the tire inside than a close-contact portion of the bead portion 12 with the rim 20.

The tread member 30 is disposed on the tire radial direction outside of the tire frame member 17. The tread member 30 is disposed along the tire frame member 17, and configures a tire tread, this being a tire ground contact portion of the tire 10. The tread member 30 is formed from a rubber having better abrasion resistance than the thermoplastic resin forming the tire frame member 17. The rubber employed in the tread member 30 may be the same type of rubber as rubber employed in conventional pneumatic tires made of rubber. Note that the tread member 30 employed may also be configured with another type of thermoplastic resin with better abrasion resistance than the thermoplastic resin forming the tire frame member 17.

Figure 2:
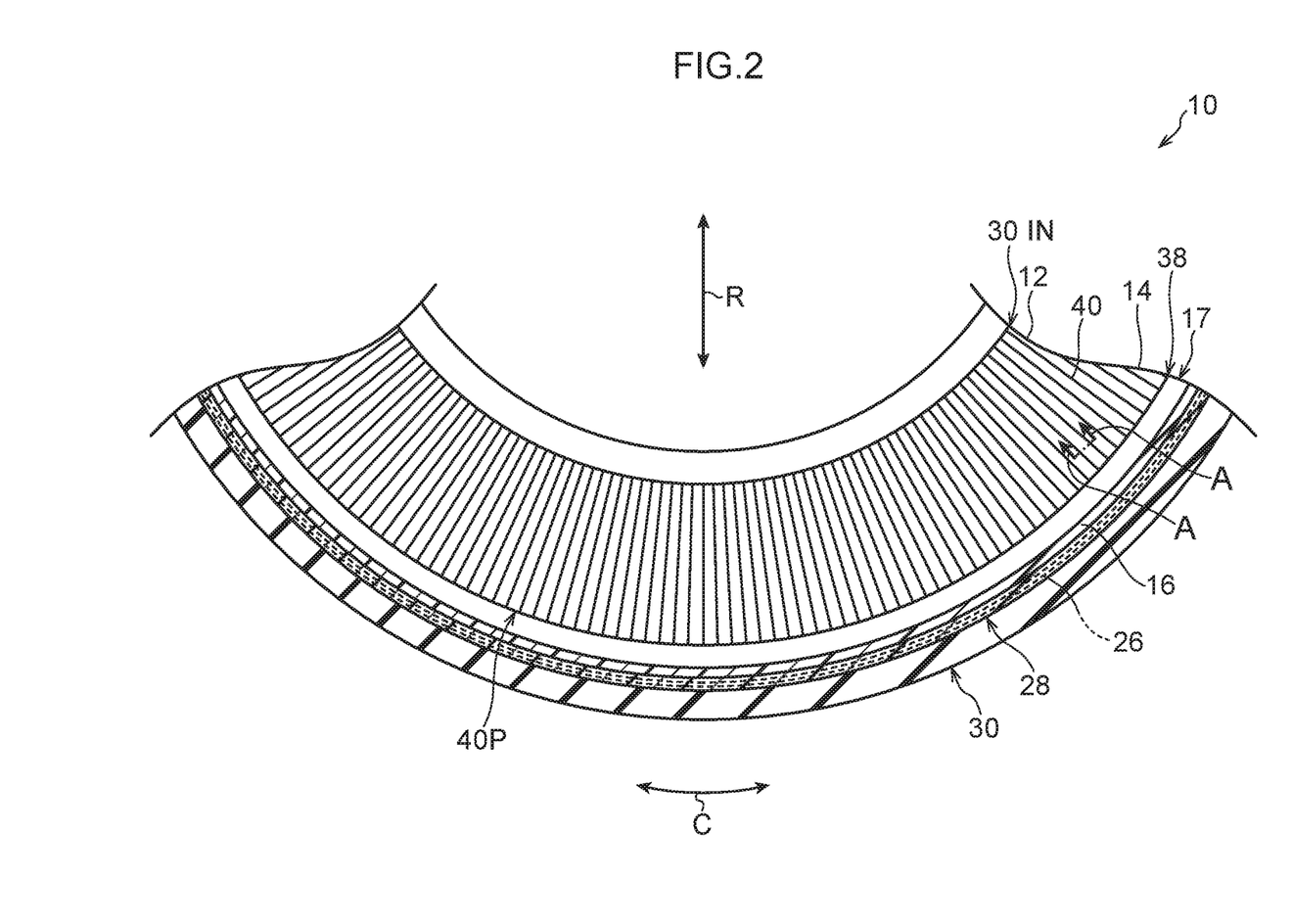
FIG. 2 is a cross section sectioned along line II-II of a pneumatic tire according to an exemplary embodiment of the present invention.

As illustrated in FIG. 2, plural inner face grooves 40 are formed to inner faces 17 IN of the tire frame member 17. The inner face grooves 40 are formed in a region spanning from the inner separation point 38 corresponding to the separation point 36 of the bead portion 12 from the rim flange 22, to a position (hereafter referred to as the "inner end portion 30 IN") of the inner face 17 IN corresponding to a tread end 30A, this being a tire axial direction W outside end of the tread member 30. This is due to there being substantially no deformation of the tire further to the tire radial direction inside than the inner separation point 38, such that there is little need to form the inner face grooves 40 there. This is also due to the tread member 30 being disposed further to the tire axial direction inside (the side nearer the tire equatorial plane CL) than the tread end 30A. This thereby enables the rigidity of the tire frame member 17 to be better maintained than in cases in which the inner face grooves 40 are formed to portions (portions not liable to deform) that are comparatively less liable to be affected by the application of load.

Figure 3:
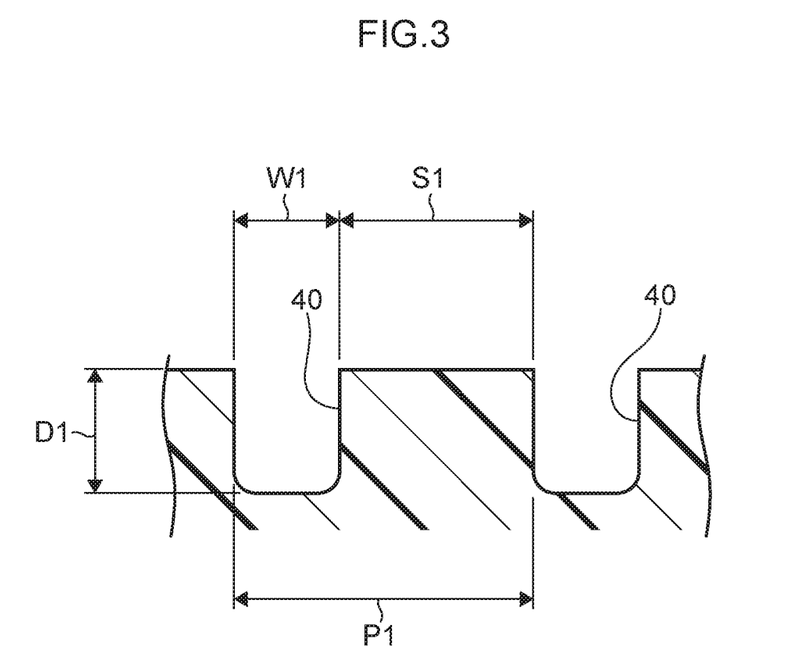
FIG. 3 is a cross section sectioned along line A-A in FIG. 2.

The respective inner face grooves 40 are formed in straight line shapes extending in the tire radial direction, and are formed around the entire circumference with a pitch P1 in the tire circumferential direction. Radial groove pattern regions 40P, these being regions in which the inner face grooves 40 are formed, are thereby formed to the inner faces of the tire frame member 17. As illustrated in FIG. 3, the pitch P1 of the inner face grooves 40 is larger than a groove width W1 of the inner face grooves 40. Namely, adjacent inner face grooves 40 are not formed contiguously, and spacings are formed between the inner face grooves 40.

Due to forming the inner face grooves 40, stress and strain acting on the tire inner faces can thereby be alleviated, and load to the tire frame member 17 formed from a resin material can thereby be reduced. The inner face grooves 40 are separated from each other, such that the resin material deforms more easily than in cases in which the inner face grooves 40 are formed contiguously in contact with each other, thereby enabling stress and strain due to compression force acting on the tire inner face to be alleviated, and enabling load to the tire frame member formed from a resin material to be reduced.

Note that the inner face grooves 40 (radial groove pattern region 40P) may be formed across the entire region from the inner separation point 38 to the tread end 30A, or may be formed to a portion thereof. The inner face grooves 40 are preferably formed to 50% or more of the region from the inner separation point to the tread end. Stress can be suppressed from concentrating at specific positions of the tire inner face 17 IN due to configuring the inner face grooves 40 in a regular repeating pattern. Moreover, the inner face grooves 40 are preferably formed around the entire tire circumferential direction such that the tire inner faces 17 IN have uniform profiles around the tire circumferential direction.

A groove depth D1 of the inner face grooves 40 is preferably from 0.2 mm to 1.5 mm. The advantageous effect of alleviating stress is small when less than 0.2 mm, and the strength of the tire frame member 17 is insufficient when over 1.5 mm.

A groove spacing 51 between adjacent inner face grooves 40 is preferably from 1 mm to 10 mm. Processing (manufacturing) the inner face grooves 40 is difficult when less than 1 mm, and the advantageous effect of alleviating stress is small when over 10 mm.

The inner face grooves 40 may be notches that effectively do not have a groove width. Note that in consideration of workability and the stress alleviating effect, the groove width W1 is preferably from 1 mm to 10 mm.

The inner face grooves 40 may be formed by forming ridges for forming the inner face grooves 40 at corresponding portions of a mold employed when injection molding the tire frame members 17.

As explained above, in the pneumatic tire 10 of the present exemplary embodiment, due to forming the inner face grooves 40 on the tire inner face, the resin forming the tire frame member 17 deforms more easily at the tire inner face, enabling stress and strain due to compression force acting on the tire inner face to be alleviated, and enabling load to be reduced.

Figure 4A:
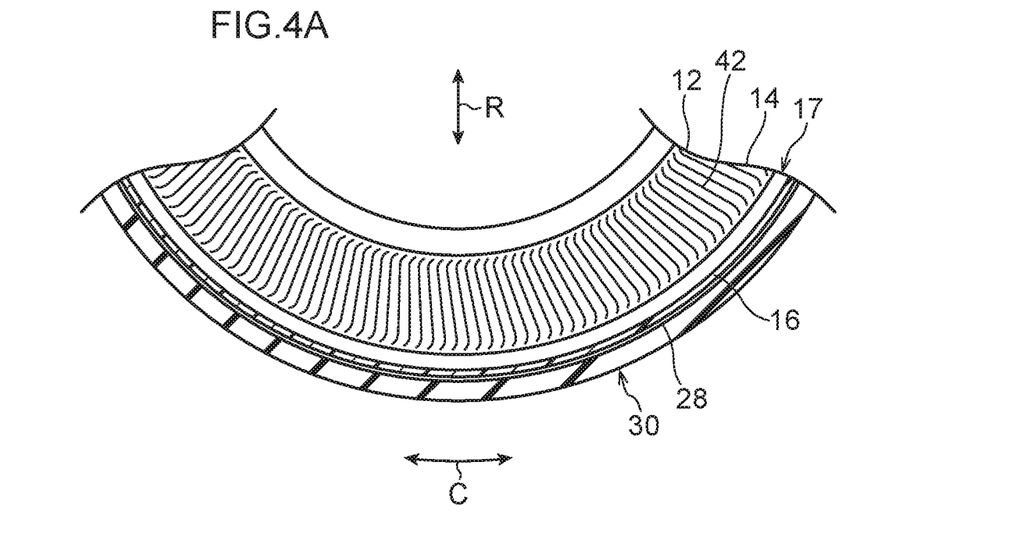
FIG. 4A is a diagram illustrating a portion of an inner face of a pneumatic tire according to a modified example of an exemplary embodiment of the present invention.
Figure 4B:
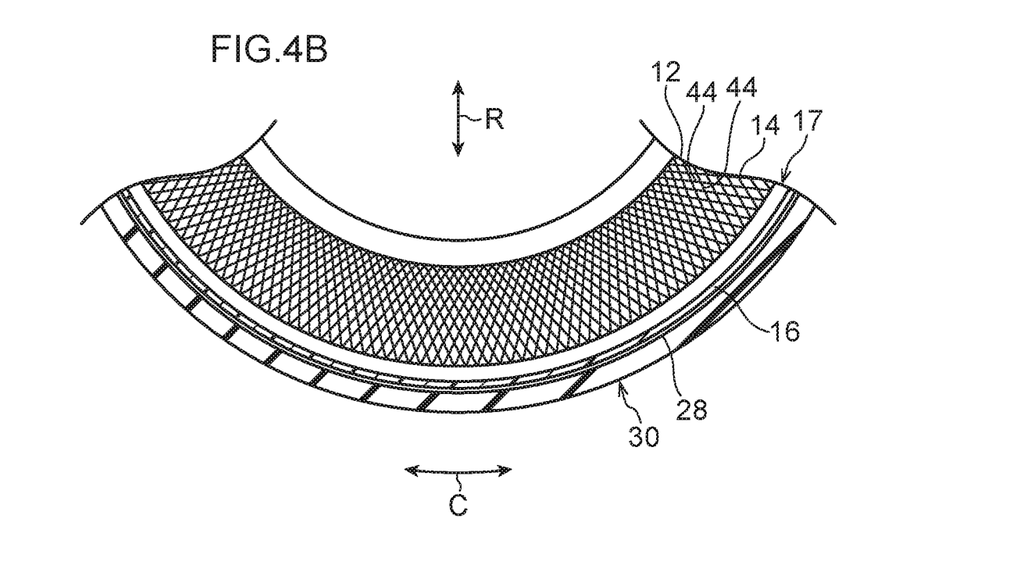
FIG. 4B is a diagram illustrating a portion of an inner face of a pneumatic tire according to a modified example of an exemplary embodiment of the present invention.
Figure 5A:
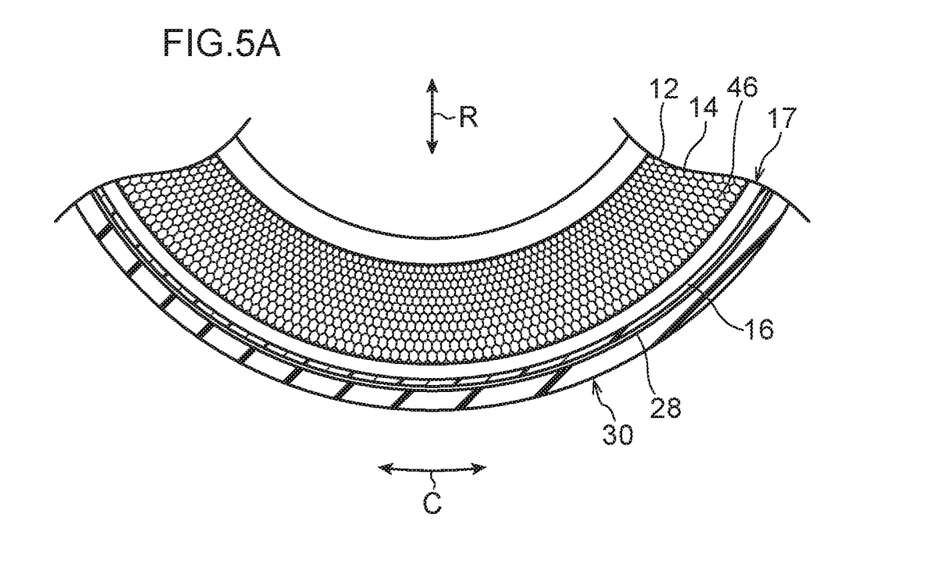
FIG. 5A is a diagram illustrating a portion of an inner face of a pneumatic tire according to another modified example of an exemplary embodiment of the present invention.
Figure 5B:
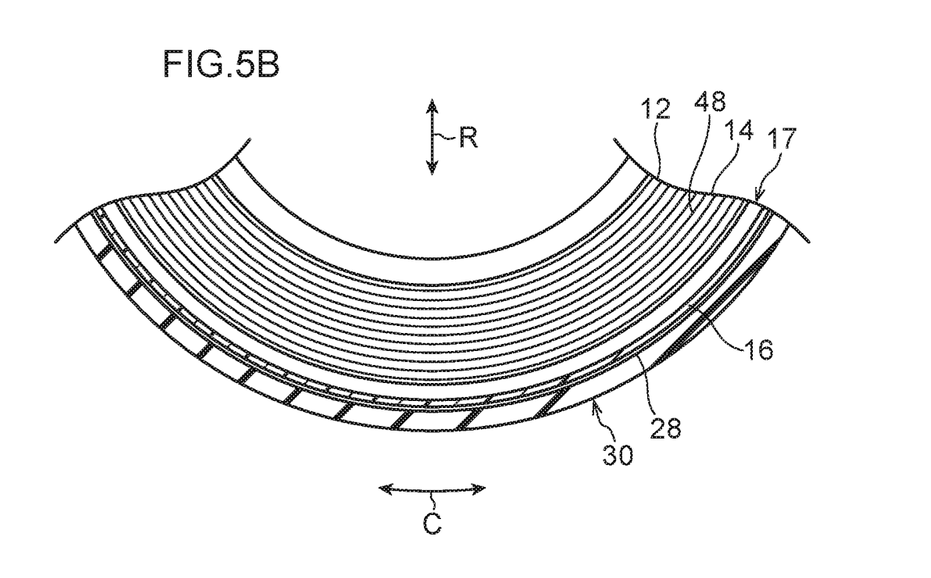
FIG. 5B is a diagram illustrating a portion of an inner face of a pneumatic tire according to another modified example of an exemplary embodiment of the present invention.

Note that in the present exemplary embodiment, explanation has been given of an example of a radial groove pattern in which the inner face grooves are formed in straight line shapes in the tire radial direction around the entire tire circumference; however, the inner face grooves may be formed in a groove pattern that has another shape. For example, as illustrated in FIG. 4A, substantially S-shaped inner face grooves 42 that extend in the tire radial direction, with both end portions thereof curving toward opposite sides to each other in the tire circumferential direction may configure an S-shaped pattern formed around the entire circumference. As illustrated in FIG. 4B, a bias pattern may be formed by a lattice of inner face grooves 44 mutually slanted with respect to the tire radial direction. As illustrated in FIG. 5A, a honeycomb pattern may be configured by hexagonally-shaped-frame inner circumferential grooves 46, or as illustrated in FIG. 5B, a circumferential direction pattern may be configured by inner circumferential grooves 47 extending around the tire circumferential direction. Configuration may be made with patterns in which grooves extend so as to diverge and converge, but are not bias patterns or honeycomb patterns.

The invention claimed is:

1. A pneumatic tire, comprising:
    a tire frame member that is made of a thermoplastic resin and that includes: a bead portion; a side portion connected to an outer side of the bead portion in a tire radial direction; and a crown portion that is connected to an inner side of the side portion in a tire width direction and on which a tread is disposed;
    a tread member that is disposed at an outer side of the tire frame member in the tire radial direction and that configures a tire tread; and
    a plurality of inner face grooves, each of which is formed at an inner face of the tire frame member on at least a portion of a region from an inner separation point corresponding to a separation point from a flange of a rim in an attached state to the rim, to an inner end portion corresponding to an end portion of the tread member,
    wherein an inter-groove pitch of the plurality of the inner face grooves is larger than a groove width of each of the inner face grooves, wherein the groove width of each of the inner face grooves is from 1 mm to less than 10 mm, wherein a deflection temperature of the thermoplastic resin under a load of 0.45 MPa, as defined by ISO 75-2 or ASTM D648, is 78° C. or greater, a tensile yield strength of the thermoplastic resin, as defined by JIS K7113, is 10 MPa or greater, and a tensile elongation of the thermoplastic resin at break, as defined by JIS K7113, is 50% or greater, and wherein each of the plurality of inner face grooves is substantially S-shaped and extends in the tire radial direction, with both end portions thereof curving toward opposite sides in the tire circumferential direction.

2. The pneumatic tire of claim 1, wherein a groove spacing between adjacent grooves of the plurality of the inner face grooves is from 1 mm to 10 mm.

3. The pneumatic tire of claim 1, wherein a groove depth of each of the plurality of inner face grooves is from 0.2 mm to 1.5 mm.

4. A pneumatic tire, comprising:

a tire frame member that is made of a thermoplastic resin and that includes: a bead portion, a side portion connected to an outer side of the bead portion in a tire radial direction, and a crown portion that is connected to an inner side of the side portion in a tire width direction and on which a tread is disposed;

a tread member that is disposed at an outer side of the tire frame member in the tire radial direction and that configures a tire tread; and a plurality of inner face grooves, each of which is formed at an inner face of the tire frame member on at least a portion of a region from an inner separation point corresponding to a separation point from a flange of a rim in an attached state to the rim, to an inner end portion corresponding to an end portion of the tread member, wherein an inter-groove pitch of the plurality of the inner face grooves is larger than a groove width of each of the inner face grooves, wherein the groove width of each of the inner face grooves is from 1 mm to less than 10 mm, wherein a deflection temperature of the thermoplastic resin under a load of 0.45 MPa, as defined by ISO 75-2 or ASTM D648, is 78° C. or greater, a tensile yield strength of the thermoplastic resin, as defined by JIS K7113, is 10 MPa or greater, and a tensile elongation of the thermoplastic resin at break, as defined by JIS K7113, is 50% or greater, wherein the plurality of inner face grooves extend across 50% or more of the region from the inner separation point to the inner end portion, and wherein each of the plurality of inner face grooves is substantially S-shaped and extends in the tire radial direction, with both end portions thereof curving toward opposite sides in the tire circumferential direction.

* * * * *